(12) United States Patent
Duan et al.

(10) Patent No.: US 12,181,442 B1
(45) Date of Patent: Dec. 31, 2024

(54) METHOD AND APPARATUS FOR MULTI-ROUND ALIGNMENT OF GAS LONG-DISTANCE PIPELINE MAGNETIC FLUX LEAKAGE INTERNAL INSPECTION DATA

(71) Applicant: Shenyang Inspection Technology Branch of Pipechina Group North Pipeline Co., Ltd., Shenyang (CN)

(72) Inventors: Mingwei Duan, Shenyang (CN); Zidong Zhu, Shenyang (CN); Zhijun Liu, Shenyang (CN); Yipei Wang, Shenyang (CN); Shijia Xi, Shenyang (CN); Zhenzhe Bi, Shenyang (CN); Lei Zhang, Shenyang (CN); Wennan Lin, Shenyang (CN); Yuqing Gao, Shenyang (CN); Yi Luan, Shenyang (CN)

(73) Assignee: Shenyang Inspection Technology Branch of Pipechina Group North Pipeline Co., Ltd., Shenyang (CN)

( * ) Notice: Subject to any disclaimer, the term of this patent is extended or adjusted under 35 U.S.C. 154(b) by 0 days.

(21) Appl. No.: 18/563,842

(22) PCT Filed: Sep. 19, 2023

(86) PCT No.: PCT/CN2023/119659
§ 371 (c)(1),
(2) Date: Nov. 22, 2023

(87) PCT Pub. No.: WO2024/078273
PCT Pub. Date: Apr. 18, 2024

(30) Foreign Application Priority Data

Oct. 13, 2022 (CN) .................. 202211252831.9

(51) Int. Cl.
*G01N 27/82* (2006.01)
*G01N 17/00* (2006.01)

(52) U.S. Cl.
CPC .......... *G01N 27/82* (2013.01); *G01N 17/006* (2013.01)

(58) Field of Classification Search
CPC ................................................... G01N 17/006
See application file for complete search history.

(56) References Cited

U.S. PATENT DOCUMENTS

| 2007/0222436 | A1 | 9/2007 | Gao et al. | |
| 2016/0178580 | A1* | 6/2016 | Huang | G01N 27/83 702/189 |
| 2018/0196005 | A1* | 7/2018 | Fanini | E21B 47/007 |

FOREIGN PATENT DOCUMENTS

| CN | 105303045 A | 2/2016 |
| CN | 108804537 A | 11/2018 |

(Continued)

*Primary Examiner* — Dominic E Hawkins
(74) *Attorney, Agent, or Firm* — Westbridge IP LLC

(57) ABSTRACT

Disclosed are a method and an apparatus for multi-round alignment of gas long-distance pipeline magnetic flux leakage internal inspection data. The method includes: identifying the primary feature point data of two sets of internal inspection data, dividing the pipeline into multiple primary pipeline sections, identifying the secondary feature points in the primary pipeline sections, aligning the secondary feature points using a segment splitting algorithm, re-aligning unaligned secondary feature points, and aligning remaining feature points and defects in the secondary pipeline sections.

5 Claims, 2 Drawing Sheets

(56) References Cited

FOREIGN PATENT DOCUMENTS

| | | |
|---|---|---|
| CN | 111159639 A | 5/2020 |
| CN | 113032380 A | 6/2021 |

\* cited by examiner identifying the primary feature point data to be aligned based on the feature point database,separately from two sets of magnetic flux leakage internal inspection data; aligning the same primary feature point data from the two sets of data according to the mileage and setting the aligned primary feature points as anchor points; segmenting the pipeline based on the anchor points, forming multiple primary pipeline segments;

recognizing the secondary feature points in the segmented primary pipeline segments identified in step 1) based on the feature point database;at the sametime, using the pipeline segment splitting algorithm to carry out the first alignment of the secondary feature points in the two aligned primary pipeline segments from the two sets of magnetic flux leakage internal inspection data;

re-aligning the secondary feature points identified in step 2) but not aligned;

using the secondary pipeline segments divided in step 3) as a unit, aligning the remaining feature points and defects in the secondary pipeline segmentone by one.

FIG. 1

METHOD AND APPARATUS FOR MULTI-ROUND ALIGNMENT OF GAS LONG-DISTANCE PIPELINE MAGNETIC FLUX LEAKAGE INTERNAL INSPECTION DATA

CROSS-REFERENCE TO RELATED APPLICATIONS

This application is the National Stage of International Application No. PCT/CN2023/119659, filed on Sep. 19, 2023, which claims priority to Chinese Patent Application No. 202211252831.9, filed on Oct. 13, 2022. All of the aforementioned applications are incorporated herein by reference in their entireties.

TECHNICAL FIELD

The present application belongs to the field of the combination of petroleum and natural gas pipeline internal inspection and artificial intelligence technology, mainly involving a method and an apparatus for multi-round alignment of gas long-distance pipeline magnetic flux leakage internal inspection data.

BACKGROUND

Pipelines are the main means of large-scale transportation of oil and gas. With the increase in their service life, the risk of leaks and explosions also increases. Therefore, it is necessary to regularly conduct pipeline integrity assessments to identify risks and ensure the safe operation of pipelines. Pipeline integrity assessment involves the continuous acquisition of internal and external inspection data to identify pipeline defects and assess risks, and appropriate measures are taken to control the risks within manageable limits. Internal inspection data is the basis for integrity assessment. Based on a single internal inspection, the location and characteristics of pipeline defects can be determined. However, by aligning multi-round internal inspection data, the location and extent of active corrosion in the pipeline can be identified, and the trend of corrosion development can be analyzed. The premise of these analyses is to align multi-round internal inspection data. Due to the influence of external environmental factors and inspection errors during the internal inspection process, different inspection operators, different inspection equipment, and many other factors can lead to certain differences in mileage, defect identification, and quantification in multi-round internal inspection data. This makes it difficult to achieve rapid alignment of multi-round internal inspection data, and manual alignment requires a huge amount of work.

When aligning two sets of internal inspection data, existing methods generally first obtain valve, elbow, circumferential weld, and defect information from the two sets of internal inspection data to be aligned. One set of data is used as the reference data for alignment, and the other set of internal inspection data is aligned in sequence according to the order of valve, elbow, circumferential weld, and defect features. When aligning a certain feature, it is judged whether the deviation value of the corresponding feature mileage in the two sets of internal inspection data is less than or equal to the deviation threshold. If it is, the deviation has been aligned; if not, the alignment data of the feature end is linearly stretched proportionally. The above method has the following problems.

1. The ultimate goal of alignment is to align welds and defects. For long-distance pipelines spanning tens of kilometers, aligning only through valves and elbows still results in large mileages for each segment and a large number of welds and defects covered in each segment, making it difficult to achieve an ideal alignment success rate and effect.

2. Different definitions of component welds such as flanges and elbows in each inspection report make it difficult to match circumferential welds. The identification of complex welds near short pipe segments and valves is particularly poor. Additionally, segments that have undergone re-routing or pipe replacement may lead to erroneous matching.

3. When aligning features, existing algorithms typically use a uniform mileage deviation mean function and deviation threshold. However, in reality, different pipeline distances have a significant impact on the mileage deviation mean function and deviation threshold. Processing with a uniform mileage deviation mean function and deviation threshold can result in significant alignment deviations.

4. Most existing alignment algorithms are based on overall linear stretching adjustment of pipeline segments using mileage ratios. However, in reality, different inspection results are affected by different definitions of start and end points, different inspection equipment, and changes in the internal environment of the pipeline over time, which can lead to non-uniform linear distribution of equipment mileage counting. Therefore, linear stretching based on mileage ratios will inevitably lead to alignment deviations.

5. Existing defect alignment algorithms, when dealing with one-to-many, many-to-one, and many-to-many alignments, often lead to misalignment or missed alignment. This is because existing alignment algorithms are determined in sequence from top to bottom. If each aligned data is re-evaluated each time, it can prevent missed alignments, but the efficiency would be very low. On the other hand, if aligned data is not re-evaluated, the efficiency would be high but missed alignments may occur. Additionally, due to the lack of specific standards for many-to-many alignments, the reliability of the results cannot be guaranteed.

6. The existing alignment algorithms have the concept of clustering, but it is only for clustering the alignment results, which is not meaningful for the alignment algorithm itself.

SUMMARY

To address the technical issues mentioned above, the present application provides a method and apparatus for multi-round alignment of gas long-distance pipeline magnetic flux leakage internal inspection data. It mainly targets the low alignment ratio of multi-round magnetic flux leakage internal inspection data for long-distance oil and natural gas pipelines, and can automatically achieve fast and accurate alignment of multi-round internal inspection data for the same pipeline segment, with a high alignment ratio and significant alignment effect.

The present application is implemented as follows: a method for multi-round alignment of gas long-distance pipeline magnetic flux leakage internal inspection data is provided, comprising the following steps.

1) Based on the feature point database, the primary feature point data to be aligned are identified separately from two sets of magnetic flux leakage internal inspection data. The same primary feature point data from the two sets of data are aligned according to the mileage, and the aligned primary feature points are set as anchor points. The pipeline is segmented based on the anchor points, forming multiple primary pipeline segments.

2) Based on the feature point database, the secondary feature points in the segmented primary pipeline segments identified in step 1) are recognized. At the same time, using the pipeline segment splitting algorithm, the first alignment of the secondary feature points in the two aligned primary pipeline segments from the two sets of magnetic flux leakage internal inspection data is carried out. The pipeline segment splitting algorithm steps are as follows.

201) Assign different feature symbols to each secondary feature point.

202) Concatenate the feature symbols of the secondary feature points in each set of magnetic flux leakage internal inspection data in ascending order of mileage on a per primary pipeline segment basis, forming a sequence for each primary pipeline segment.

203) Based on the LCS algorithm, the longest common subsequence is searched in the sequence of two aligned primary pipeline segments in two sets of magnetic flux leakage internal inspection data. Assuming the first set of magnetic flux leakage internal inspection data is the reference data and the later set is the aligned data, the longest common subsequence exists in the sequence of the reference data (x0, x1, x2 . . . xi) and the sequence of the aligned data (y0, y1, y2 . . . yj). The length of the longest common subsequence C[i,j] is:

$$C[i, j] = \begin{cases} 0 & \text{if } i = 0 \text{ or } j = 0 \\ C[i-1, j-1] + 1 & \text{if } i, j > 0, x_i = y_j \\ \max\{C[i, j-1], C[i-1, j]\} & \text{if } i, j > 0, x_i \neq y_i \end{cases}$$

204) For the longest common subsequence found in step 203), align each of the included secondary feature points one by one. For each secondary feature point, calculate the ratio k using the linear relationship ratio function:

$k=K2/K1$ where K1 is the length of the current primary pipe segment where the reference secondary feature point is located, and K2 is the length of the current primary pipe segment where the aligned secondary feature point is located. Use the mileage deviation threshold calculation function to obtain the estimated mileage range t for the aligned secondary feature point:

$t=k*(M1\pm\Delta m)$ where M1 is the distance of the benchmark secondary feature point from the already matched primary feature point or secondary feature point upstream, and $\Delta m$ is the range of mileage deviation of the benchmark secondary feature point. If the distance of aligning the secondary feature point to the already matched feature point upstream $M2 \in t$, it is considered that the current alignment of the secondary feature point is successful. The aligned secondary feature point is taken as the latest node data, and the linear relationship ratio function and mileage deviation threshold calculation function are imported for updating training. If $M2 \notin t$, it is considered a failed alignment, and the same type of alignment data is searched within the mileage estimation range t, which is not in the longest common subsequence, and the alignment is performed again.

3) Re-align the secondary feature points identified in step 2) but not aligned, use the linear relationship ratio function and the mileage deviation threshold calculation function. Within athe mileage estimation range t, find the closest k*M1 type of secondary feature points in the two sets of leaked internal detection data, which are aligned as the secondary feature points. Take the data of this point as the latest node data, import it into the linear relationship ratio function and the mileage deviation threshold calculation function, update the training, and use the aligned secondary feature points in steps 2) and 3) as nodes to divide each primary pipeline segment into secondary pipeline segments.

4) Use the secondary pipeline segments divided in step 3) as a unit, and align the remaining feature points and defects in the secondary pipeline segment one by one. For feature point alignment, repeat the method in step 3), and for defect alignment, use the cluster division method for alignment.

401) Cluster the defects in the current secondary pipeline segment.

402) Call the linear relationship ratio function and the mileage deviation threshold calculation function to calculate the angle range $c=C1\pm\Delta c$, where C1 is the base defect angle value, range 0~360°, $\Delta c$ is the angle deviation threshold. Within the angle range c, find the defects in the list closest to k*M1 within the mileage range t as the aligned defects, thus completing the alignment of the two sets of leaked internal detection data.

Additionally, the feature database in step 1) includes various points such as metal loss, geometric deformation, abnormal welds, valve, branch pipe, tee, elbow, casing, flange, external support, and positioning points. Primary feature points include valves and tees. In step 2, the secondary feature points are the components for segmenting the pipe, including elbows, flanges, and circumferential welds.

Furthermore, in step 1), the starting and ending points of the pipe segments that have been replaced or changed are also set as anchor points, and the feature point data in this area in the two sets of leaked internal detection data is marked with a non-alignment flag.

Furthermore, in step 4), the clustering criteria are based on ASME and DNV standards. According to the ASME standard, the distance between adjacent defect boundaries $\Delta d<3$ times the wall thickness; while according to the DNV standard, the axial distance between adjacent defect boundaries $\Delta l<$the minimum length of the two defects and the circumferential distance $\Delta w<$the minimum width of the two defects.

The present application also provides an apparatus for multi-round alignment of gas long-distance pipeline magnetic flux leakage internal inspection data, which includes the following modules:

a primary pipeline segment division module for identifying the primary feature point data that needs to be aligned in the two sets of leaked internal detection data based on the feature point database, aligning the same primary feature point data in the two sets of data according to the mileage, setting the aligned primary feature points as anchor points, and dividing the pipeline into multiple primary pipeline segments based on the anchor points;

a secondary pipeline segment division first alignment module, for identifying the secondary feature points in the segmented primary pipeline segments and aligning the secondary feature points in the two aligned primary pipeline segments using a pipeline segment splitting algorithm;

a secondary pipeline segment division second alignment module, for realigning the secondary feature points that were identified but not aligned in the first alignment module, and dividing the primary pipeline segments into secondary pipeline segments based on the alignment results of the first and second alignment modules;

a secondary pipe segment residual feature points and defect alignment module, which is used to align the remaining feature points and defects within the secondary pipe segment in units of the secondary pipe segment divided by the secondary alignment module.

Compared with the existing technology, the advantage of the present application is as follows.

1. Through the feature database, it is possible to identify more detailed components of the pipeline, including shorter pipe segments and complex welds near the valves, thereby dividing the long-distance pipeline into smaller segments, fundamentally improving the alignment ratio and alignment effect. At the same time, the pipeline splitting algorithm based on the longest common subsequence principle ensures the optimality of the pipeline splitting scheme, improving the performance and accuracy of data alignment.

2. Pipe segments that have undergone replacement or route changes can be manually marked by the system, and the marked pipe segments will not be aligned. This can avoid the impact of unnecessary alignment data on subsequent alignment.

3. The process of aligning feature points and stretching alignment no longer uses linear functions. Instead, it calculates nonlinear functions through continuous data updates, making the judgment of feature points and the stretching alignment of data more accurate.

4. The concept of clustering is introduced for alignment, resulting in higher accuracy and reliability for the alignment results of complex situations such as multiple-to-one, one-to-many, and many-to-many defect alignments.

BRIEF DESCRIPTION OF THE DRAWINGS

FIG. 1 shows the flowchart of the method for multi-round alignment of gas long-distance pipeline magnetic flux leakage internal inspection data provided by the present application.

DETAILED DESCRIPTION OF THE EMBODIMENTS

Figure 2:
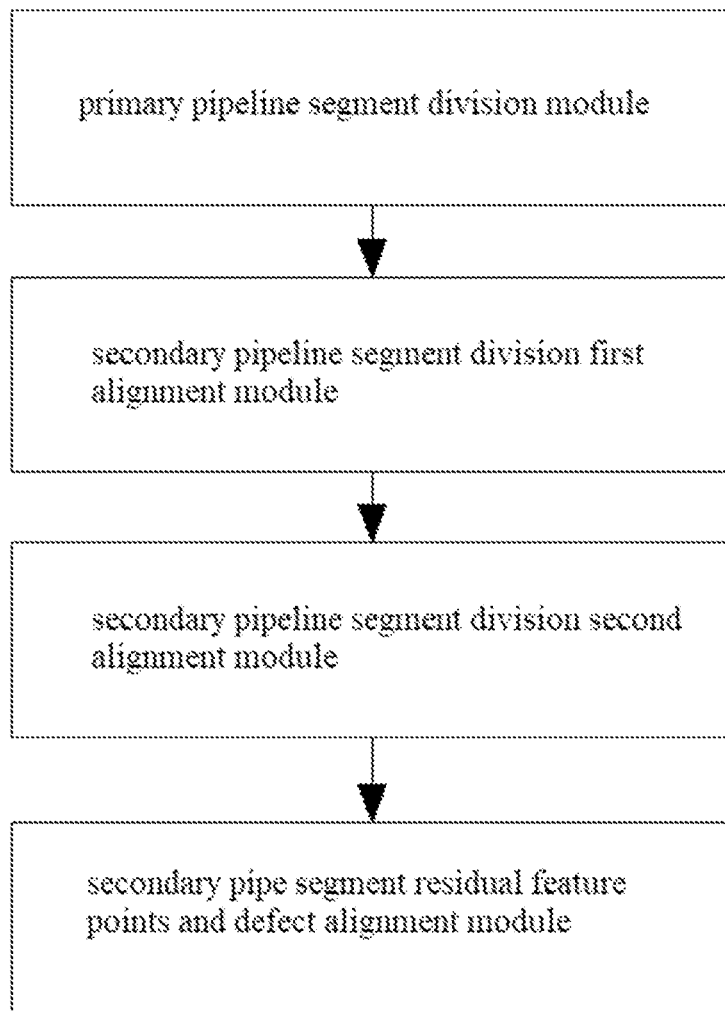
FIG. 2 shows the connection diagram of the apparatus for multi-round alignment of gas long-distance pipeline magnetic flux leakage internal inspection data provided by the present application.

In the following, specific implementation schemes are used to further explain and illustrate the present application, but they are not intended to limit the scope of the present application.

Referring to FIG. 1, the present application provides a method for multi-round alignment of gas long-distance pipeline magnetic flux leakage internal inspection data, including the following steps.

1) According to the feature point database, identify the primary feature point data that needs to be aligned in the two sets of magnetic flux leakage internal inspection data. Align the same primary feature point data in the two sets of data based on the mileage, set the aligned primary feature points as anchor points, and divide the pipeline into segments based on the anchor points, forming multiple primary pipeline segments. At the same time, set the starting and ending points of the pipeline segments that have been replaced or changed as anchor points, and mark the feature point data in this area of the two sets of magnetic flux leakage internal inspection data as non-aligned.

The feature point database is formed based on the imported original data, and the feature points in the database include metal loss, geometric deformation, weld anomalies, circumferential welds, valves, branch pipes, tees, elbows, casings, flanges, external supports, and positioning points. Primary feature points refer to feature points that are not easily changed and have a high detection rate, including valves and tees.

2) According to the feature point database, identify the secondary feature points in each primary pipeline segment divided in step 1). The secondary feature points are components for dividing the pipeline segments, including elbows, flanges, and circumferential welds. At the same time, use the pipeline segment splitting algorithm to align the secondary feature points in the two aligned primary pipeline segments of the two sets of magnetic flux leakage internal inspection data for the first time. The steps of the pipeline segment splitting algorithm are as follows.

201) Assign different feature symbols to each secondary feature point, for example, circumferential welds are A, flanges are B, the start of elbows is C, and the end of elbows is D, etc.

202) In units of primary pipe sections, the feature symbols of the secondary feature points in each set of magnetic flux leakage internal inspection data are concatenated in ascending order of mileage, forming a sequence for each primary pipe section.

203) Based on the LCS algorithm, find the longest common subsequence in the sequences of the two aligned primary pipeline segments in the two sets of magnetic flux leakage internal inspection data. Assume that one set of magnetic flux leakage internal inspection data detected first is the reference data, and the later-detected set is the aligned data. The longest common subsequence exists in the sequence $(x_0, x_1, x_2 \ldots x_i)$ of the reference data and the sequence $(y_0, y_1, y_2 \ldots y_j)$ of the aligned data. The length of the longest common subsequence $C[i,j]$ is:

$$C[i, j] = \begin{cases} 0 & \text{if } i = 0 \text{ or } j = 0 \\ C[i-1, j-1] + 1 & \text{if } i, j > 0, x_i = y_j \\ \max\{C[i, j-1], C[i-1, j]\} & \text{if } i, j > 0, x_i \neq y_i \end{cases}$$

204) Align each of the secondary feature points included in the longest common subsequence found in step 203) one by one. For each secondary feature point, use the linear relationship ratio function to obtain the ratio k:

$k = K2/K1$ where K1 is the length of the primary pipeline segment where the reference secondary feature point is currently located, and K2 is the length of the primary pipeline segment where the aligned secondary feature point is currently located; use the mileage deviation threshold calculation function to obtain the mileage estimation range t for the aligned secondary feature point:

$t = k*(M1 \pm \Delta m)$ where M1 is the distance of the benchmark secondary feature point from the already matched primary feature point or secondary feature point upstream, and $\Delta m$ is the range of mileage deviation of the benchmark secondary feature point. If the distance of aligning the secondary feature point to the already matched feature point upstream $M2 \in t$, it is considered that the current alignment of the secondary feature point is successful. The aligned secondary feature point is taken as the latest node data, and the linear relationship ratio function and mileage deviation threshold calculation function are imported for updating training. If $M2 \not\subseteq t$, it is considered a failed alignment, and the same type of alignment data is searched within the mileage estimation range t, which is not in the longest common subsequence, and the alignment is performed again.

To ensure a more accurate calculation of the feature mileage on both sides and improve the alignment accuracy, the distance from the matched primary or secondary feature point is used.

3) Re-align the secondary feature points identified in step 2) but not aligned, use the linear relationship ratio function and the mileage deviation threshold calculation function. Within the mileage estimation range t, find the closest k*M1 type of secondary feature points in the two sets of leaked internal detection data, which are aligned as the secondary feature points. Take the data of this point as the latest node data, import it into the linear relationship ratio function and the mileage deviation threshold calculation function, update the training, and use the aligned secondary feature points in steps 2) and 3) as nodes to divide each primary pipeline segment into secondary pipeline segments.

In this step, when finding the closest secondary feature points of the same type in the two sets of magnetic flux leakage internal inspection data to k*M1, $\Delta m$ is not added, because $\Delta m$ is a threshold value for the mileage deviation range. Adding $\Delta m$ gives the maximum range, but we want to find a feature that is closest to the estimated point, so we cannot add $\Delta m$.

4) Use the secondary pipeline segments divided in step 3) as a unit, and align the remaining feature points and defects in the secondary pipeline segment one by one. For feature point alignment, repeat the method in step 3), and for defect alignment, use the cluster division method for alignment.

Because the development of defects inside the pipeline is irreversible, the volume of corrosion defects will increase over time, without considering differences in detector performance. If it's due to environmental reasons, a few individual corrosion defects can easily develop into large areas of corrosion defects, which brings a lot of difficulty to the alignment work. Therefore, in this application, the concept of clustering is introduced for defect alignment, which can improve the accuracy of many-to-many defect alignment. Additionally, because industry-standard clustering criteria are used, it also enhances the reliability of defect alignment results.

401) Cluster the defects within the current secondary pipeline segment.

Before carrying out the alignment algorithm, it's necessary to cluster the defects within the current pipeline segment. The benefit of this approach is that during subsequent alignment processing, the clusters will appear as a whole, improving efficiency and reducing the likelihood of misalignment. The clustering criteria are based on ASME and DNV standards. ASME standard: the distance between adjacent defect boundaries $\Delta d < 3$ times the wall thickness; DNV standard: the axial distance between adjacent defect boundaries $\Delta l <$ the minimum length of the two defects and the circumferential distance $\Delta w <$ the minimum width of the two defects.

402) Call the linear relationship ratio function and the mileage deviation threshold calculation function to calculate the angle range $c = C1 \pm \Delta c$, where C1 is the base defect angle value, range 0~360°. $\Delta c$ is the angle deviation threshold. Within the angle range c, find the defects in the list closest to k*M1 within the mileage range t as the aligned defects, thus completing the alignment of the two sets of leaked internal detection data.

Referring to FIG. 2, the present application also provides an apparatus for multi-round alignment of gas long-distance pipeline magnetic flux leakage internal inspection data using the above method, including the following modules:

a primary pipeline segment division module for identifying the primary feature point data that needs to be aligned in the two sets of leaked internal detection data based on the feature point database, aligning the same primary feature point data in the two sets of data according to the mileage, setting the aligned primary feature points as anchor points, and dividing the pipeline into multiple primary pipeline segments based on the anchor points;

a secondary pipeline segment division first alignment module, for identifying the secondary feature points in the segmented primary pipeline segments and aligning the secondary feature points in the two aligned primary pipeline segments using a pipeline segment splitting algorithm;

a secondary pipeline segment division second alignment module, for realigning the secondary feature points that were identified but not aligned in the first alignment module, and dividing the primary pipeline segments into secondary pipeline segments based on the alignment results of the first and second alignment modules; and a secondary pipe segment residual feature points and defect alignment module, which is used to align the remaining feature points and defects within the secondary pipe segment in units of the secondary pipe segment divided by the secondary alignment module.

What is claimed is:

1. A method for multi-round alignment of gas long-distance pipeline magnetic flux leakage internal inspection data, comprising the following steps:

1) identifying primary feature point data to be aligned based on a feature point database, separately from two sets of magnetic flux leakage internal inspection data; aligning the same primary feature point data from the two sets of data according to the mileage and setting aligned primary feature points as anchor points; segmenting the pipeline based on the anchor points, forming multiple primary pipeline segments;

2) recognizing secondary feature points in the segmented primary pipeline segments identified in step 1) based on the feature point database; at the same time, using the pipeline segment splitting algorithm to carry out a first alignment of the secondary feature points in the two aligned primary pipeline segments from the two sets of magnetic flux leakage internal inspection data; the steps of the pipeline segment splitting algorithm are as follows:

201) assigning different feature symbols to each secondary feature point;

202) concatenating feature symbols of the secondary feature points in each set of magnetic flux leakage internal inspection data in ascending order of mileage on a per primary pipeline segment basis, forming a sequence for each primary pipeline segment;

203) searching for a longest common subsequence in the sequence of two aligned primary pipeline segments in two sets of magnetic flux leakage internal inspection data based on a LCS algorithm; assuming a first set of magnetic flux leakage internal inspection data is a reference data and a later set is an aligned data, the longest common subsequence exists in the sequence of the reference data (x0, x1, x2 ... xi) and the sequence of the aligned data (y0, y1, y2 ... yj); the length of the longest common subsequence C[i,j] is:

$$C[i, j] = \begin{cases} 0 & \text{if } i = 0 \text{ or } j = 0 \\ C[i-1, j-1] + 1 & \text{if } i, j > 0, x_i = y_j \\ \max\{C[i, j-1], C[i-1, j]\} & \text{if } i, j > 0, x_i \neq y_i \end{cases}$$

204) aligning each of the included secondary feature points one by one for the longest common subsequence found in step 203); for each secondary feature point, calculating a ratio k using a linear relationship ratio function:

$$k = K2/K1$$

wherein K1 is a length of the current primary pipe segment where the reference secondary feature point is located, and K2 is the length of the current primary pipe segment where the aligned secondary feature point is located; using a mileage deviation threshold calculation function to obtain an estimated mileage range t for the aligned secondary feature point:

$$t = k*(M1 \pm \Delta m)$$

wherein M1 is a distance of the benchmark secondary feature point from the already matched primary feature point or secondary feature point upstream, and $\Delta m$ is a range of mileage deviation of the benchmark secondary feature point; if the distance of aligning the secondary feature point to an already matched feature point upstream $M2 \in t$, it is considered that the current alignment of the secondary feature point is successful the aligned secondary feature point is taken as a latest node data, and the linear relationship ratio function and mileage deviation threshold calculation function are imported for updating training; if $M2 \notin t$, searching for the same type of alignment data within the mileage estimation range t, which is not in the longest common subsequence, and aligning again;

3) re-aligning the secondary feature points identified in step 2) but not aligned, using the linear relationship ratio function and the mileage deviation threshold calculation function; within the mileage estimation range t, finding a closest k*M1 type of secondary feature points in the two sets of leaked internal detection data, which are aligned as the secondary feature points; taking the data of this point as the latest node data, importing it into the linear relationship ratio function and the mileage deviation threshold calculation function, updating a training, and using the aligned secondary feature points in steps 2) and 3) as nodes to divide each primary pipeline segment into secondary pipeline segments;

4) using the secondary pipeline segments divided in step 3) as a unit, aligning remaining feature points and defects in the secondary pipeline segment one by one; for feature point alignment, repeating the method in step 3), and for defect alignment, using the cluster division method for alignment:

401) clustering the defects in the current secondary pipeline segment;

402) calling the linear relationship ratio function and the mileage deviation threshold calculation function to calculate a angle range $c = C1 \pm \Delta c$, wherein C1 is a base defect angle value, range 0~360°, $\Delta c$ is the angle deviation threshold; within the angle range c, finding the defects in a list closest to k*M1 within the mileage range t as the aligned defects, thus completing the alignment of the two sets of leaked internal detection data.

2. The method for multi-round alignment of gas long-distance pipeline magnetic flux leakage internal inspection data according to claim 1, wherein in step 1), the feature points in the feature database comprise metal loss, geometric deformation, weld seam anomalies, ring welds, valves, branch pipes, tees, bends, casings, flanges, external supports, and positioning points; primary feature points comprise valves and tees; in step 2), the secondary feature points are the components for segmenting the pipeline, comprising bends, flanges, and ring welds.

3. The method for multi-round alignment of gas long-distance pipeline magnetic flux leakage internal inspection data according to claim 1, wherein in step 1), the starting and ending points of the pipe segments that have been replaced or changed are also set as anchor points, and the feature point data in this area in the two sets of magnetic flux leakage internal detection data is marked with a non-alignment flag.

4. The method for multi-round alignment of gas long-distance pipeline magnetic flux leakage internal inspection data according to claim 1, wherein in step 4), the clustering criteria are based on ASME and DNV standards; according to the ASME standard, the distance between adjacent defect boundaries $\Delta d < 3$ times the wall thickness; while according to the DNV standard, the axial distance between adjacent defect boundaries $\Delta l <$ the minimum length of the two defects and the circumferential distance $\Delta w <$ the minimum width of the two defects.

5. An apparatus for multi-round alignment of gas long-distance pipeline magnetic flux leakage internal inspection data using the method for multi-round alignment of gas long-distance pipeline magnetic flux leakage internal inspection data according to claim 1, comprising the following modules:

a primary pipeline segment division module for identifying the primary feature point data that needs to be aligned in the two sets of leaked internal detection data based on the feature point database, aligning the same primary feature point data in the two sets of data according to the mileage, setting the aligned primary feature points as anchor points, and dividing the pipeline into multiple primary pipeline segments based on the anchor points;

a secondary pipeline segment division first alignment module, for identifying the secondary feature points in the segmented primary pipeline segments and aligning the secondary feature points in the two aligned primary pipeline segments using a pipeline segment splitting algorithm;

a secondary pipeline segment division second alignment module, for realigning the secondary feature points that were identified but not aligned in the first alignment module, and dividing the primary pipeline segments into secondary pipeline segments based on the alignment results of the first and second alignment modules; and a secondary pipe segment residual feature points and defect alignment module, which is used to align the remaining feature points and defects within the secondary pipe segment in units of the secondary pipe segment divided by the secondary alignment module.

* * * * *